United States Patent
Khosla et al.

(10) Patent No.: US 8,214,309 B1
(45) Date of Patent: Jul. 3, 2012

(54) COGNITIVE-NEURAL METHOD FOR IMAGE ANALYSIS

(75) Inventors: Deepak Khosla, Camarillo, CA (US); Michael J. Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 702 days.

(21) Appl. No.: 12/316,779

(22) Filed: Dec. 16, 2008

(51) Int. Cl.
  *G06F 15/18* (2006.01)
  *G06E 1/00* (2006.01)
  *G06E 3/00* (2006.01)
  *G06G 7/00* (2006.01)

(52) U.S. Cl. ............................. 706/14; 706/18; 706/20

(58) Field of Classification Search .................. None
  See application file for complete search history.

(56) References Cited

U.S. PATENT DOCUMENTS

| | | | |
|---|---|---|---|
| 6,670,963 B2 | 12/2003 | Osberger | |
| 7,599,894 B2 * | 10/2009 | Owechko et al. | 706/14 |
| 7,835,581 B2 * | 11/2010 | Mathan et al. | 382/224 |
| 2005/0047647 A1 | 3/2005 | Rutishauser et al. | |
| 2007/0173699 A1 | 7/2007 | Mathan et al. | |
| 2007/0236488 A1 | 10/2007 | Mathan et al. | |
| 2008/0056611 A1 | 3/2008 | Mathan et al. | |
| 2010/0220906 A1 * | 9/2010 | Abramoff et al. | 382/130 |

FOREIGN PATENT DOCUMENTS

WO    WO 03/093947    11/2003

OTHER PUBLICATIONS

Thorpe, S., et al., "Speed of processing in the human visual system," Nature, vol. 381, pp. 520-522, 1996.

Gerson, A.D., et al., "Cortically-coupled computer vision for rapid image search," Neural Systems and Rehabilitation Engineering, IEEE Transactions on, vol. 14(2), pp. 174-179, Jun. 2006.

Itti, L., et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Itti, L., et al., "A saliency-based search mechanism for overt and covert shifts of visual attention," Vision Research, 40: 1489-1506, 2000.

Itti, L., et al., "Bayesian surprise attracts human attention," Advances in Neural Information Processing Systems, 19, 1-8, 2006.

Gladwell, M., "Blink: the power of thinking without thinking," 1st ed. Little, brown and company: Time Warner Book Group, New York, 2005.

Keysers, C., et al., "The Speed of Sight," Journal of Cognitive Neuroscience, 13(1), 90-101, 2001.

(Continued)

*Primary Examiner* — Kakali Chaki
*Assistant Examiner* — Daniel Pellett
(74) *Attorney, Agent, or Firm* — Tope-McKay & Assoc.

(57) ABSTRACT

A self adapting cognitive-neural method and system for image analysis is disclosed. The method comprises detecting a set of potential items of interest in an image using a cognitive algorithm, refining the set of potential items of interest using a neural analysis, and adapting the cognitive algorithm based on information gained from the results of the neural analysis. The method may further comprise fusing the results of the cognitive and neural algorithms with a fusion classifier. The neural analysis can include eye tracked EEG, RSVP, or presentation to an operator for visual inspection.

27 Claims, 8 Drawing Sheets

OTHER PUBLICATIONS

Fabre-Thorpe, M., et al., "A limit to the speed of processing in Ultra-Rapid visual categorization of novel natural scenes," Journal of Cognitive Neuroscience, 13, 171-180, 2001.

Hopf, J.-M., et al., "Localizing visual discrimination processes in time and space," The American Physiological Society, 88, 2088-2095, 2002.

Eimer, M., "Does the face-specific N170 component reflect the activity of a specialized eye processor?" Neuroreport, 9, 2945-2948, 1998.

Berka, C., et al., "Evaluation of an EEG-workload model in an aegis simulation environment" in Proceedings of SPIE Defense and Security Symposium, 90-99, 2005.

Bentin, S., et al., "Electrophysiological studies of face perception in humans," Journal of Cognitive Neuroscience, 8, 551-565, 1996.

Vogel, E.K., et al., "The Visual NI Component as an index of a discrimination process," Psychophysiology, 2000.

Yamaguchi, S., et al., "Cerebral Asymmetry of the 'Top-down' allocation of attention to global and local features," The Journal of Neuroscience, 20, 1-5, 2000.

Sun, Y., et al., "Probabilistic judgment by a coarser scale: behavioral and ERP evidence," in Proceedings of the Twenty-sixth Annual meeting of the Cognitive Science Society, 2004.

Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, © Springer-Verlag Berlin Heidelberg.

Navalpakkam, V., et al., "Modeling the influence of task on attention," Vision Research, 45, 205-231, 2005.

Navalpakkam, V, et al., "Search goal tunes visual features optimally," Neuron, 53, 605-617, 2007.

Peters, R.J., et al, "Beyond bottom-up: Incorporating task-dependent influences into computational model of spatial attention," in: Proc. IEEE Conference on Computer Vision and Pattern Recognition (CVPR), 2007.

Khosla, D., et al., "Bio-inspired visual attention and object recognition," Proc. SPIE 6560, 656003, 2007.

Khosla, D., et al., "A bio-inspired system for spatio-temporal recognition in static and video imagery," Proc. SPIE 6560, 656002, 2007.

Owechko, Y., et al., "A swarm-based volition/attention framework for object recognition," IEEE Conference on Computer Vision and Pattern Recognition, San Diego, 2005.

Owechko, Y., et al., "Cognitive swarms for rapid detection of objects and associations in visual imagery," IEEE Swarm Intelligence Symposium, 2005.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Gladwell, M., "Blink: the power of thinking without thinking," 1st ed. Little, brown and company: Time Warner Book Group, New York, 2005, pp. 18-47.

http://en.wikipedia.org/Travelling_salesman_problem.

Andoni A., et al., "Near-Optimal Hashing Algorithms for Near Neighbor Problem in High Dimensions," Proceedings of the Symposium on Foundations of Computer Science (FOCS'06), 2006.

Richard P. Wildes, "A measure of motion salience for surveillance applications" in Proc. IEEE Int'l Conf. Image Processing,1998.

Berg A., "Shape matching and object recognition," Ph.D. thesis, UC Berkeley, Computer Science Division, Berkeley, CA, Dec. 2005.

Bhattacharyya, R., et al., "Optimal image ordering for rapid serial visual presentation using electroencephalography," Presented at Society of NeuroScience (SfN) annual meeting, Chicago, 2009.

Carpenter G.A., et al., "A massively parallel architecture for a self-organizing neural pattern recognition machine," Computer Vision, Graphics, and Image Processing, 37, 54-115, 1987.

Carpenter G.A., et al., "The what-and-where filter a spatial mapping neural network for object recognition and image understanding," Computer Vision and Image Understanding, 69, 1-22, 1998.

Carpenter G.A., "Default ARTMAP," in Proc. of the International Joint Conference on Neural Networks (IJCNN'03), 1396-1401, 2003.

Carpenter G.A., et al., "Self-organizing information fusion and hierarchical knowledge discovery: a new framework using ARTMAP neural networks," Neural Networks, 18, 287-295, 2005.

Zang H., et al., "SVM-KNN: Discriminative nearest neighbor classification for visual category recognition," CVPR 2006.26. Vazirani, V., "Approximation algorithms," Springer-Verlag, Berlin, Germany, p. 32, 2004.

Draper B., et al., "Evaluation of Selective Attention under Similarity Transforms," In Workshop on Performance and Attention in Computer Vision. Graz, Austria, Apr. 2003.

Eckhorn R., et al., "Coherent Oscillations: A Mechanism of feature linking in the visual cortex?" Biological Cybernetics 60, 121-130, 1988.

Vazirani, V., "Approximation Algorithms," Springer-Verlag, Berlin, Germany. pp. 32-33 (2004).

University of California, San Diego Complex Systems and Cognition Laboratory, CSCLAB Image Database http://csclab.ucsd.edu/labeledimages.php. 2006.

Field D.J., "Relations between the statistics of natural images and the response properties of cortical cells," J. Opt. Soc. Am. A., 4: 2379-2394, 1987.

Fei-Fei L., et al., "Learning generative visual models from few training examples: an incremental Bayesian approach tested on 101 object categories," CVPR 2004, Workshop on Generative-Model Based Vision, 2004.

Wolfe J.M., "Visual Search in continuous, naturalistic stimuli," Vision Research 34: 1187-1195, 1994.

Walther D., et al, "Attentional selection for object recognition—a gentle way," Lecture Notes in Computer Science 2525: 472-479, 2002.

Gutin, G., et al., "Traveling salesman should not be greedy: domination of analysis of greedy-type heuristics for the TSP," Discrete Applied Mathematics, 117:81-86, 2002.

Gray C.M., et al., "Oscillatory Responses in Cat visual cortex exhibit intercolumnar synchronization which reflects global stimulus properties," Nature 338: 334-336, 1989.

Sun Y., et al., "Hierarchical selectivity for object-based visual attention," Submitted to Artificial Intelligence, 2004.

Rogowitz, B.E., et al., "Perceptual image similarity experiments," Proceedings of SPIE, 3299: 576-590, 1998.

Itti L., et al., "A Model of Saliency-Based Visual Attention for Rapid Scene Analysis," IEEE Transactions on Pattern Analysis and Machine Intelligence, 20, 1254-1259, 1998.

Orabona F., et al., "Object-based Visual Attention: A Model for a Behaving Robot," In 3rd International Workshop on Attention and Performance in Computational Vision (in CVPR 2005), San Diego, CA, Jun. 2005.

Serre T., et al., "Object recognition with features inspired by visual cortex," in Proceedings of the IEEE conference on computer vision and pattern recognition (CVPR), San Diego, CA, Jun. 2005.

Scholl B.J., "Objects and Attention: the state of the art," Cognition 80, 1-46, 2001.

Smeulders, A., et al., "Content-based image retrieval at the end of the early years," IEEE Transactions on PAMI, 22(12): 1349-1380, 2000.

Niebur E., at al., "Control of selective visual attention: modeling the 'where' pathway," In D. Touretzky, M Mozer and M. Hasselmo. Neural Imformation Processing Systems (NIPS 8), 802-808, Cambridge, MA, MIT, Press 1996.

Nene S.A., et al., "Columbia Object Image Library (COIL-100)," Technical Report CUCS-006-96, Feb. 1996.

Koch C., et al., "Shifts in selective visual attention: towards the underlying neural circuitry," Human Neurobiology, 4: 219-227, 1985.

Lazebnik S., et al., "Beyond Bags of Features: spatial pyramid matching for recognizing natural scene categories," In: Proc. IEEE Conference on Computer Vision and Pattern Recognition (CVPR), 2006.

Ling, H., et al., "Diffusion distance for histogram comparison," IEEE Computer Society Conference on Computer Vision and Pattern Recognition (CVPR), 2006.

Morrison, D., et al., "Semantic clustering of images using patterns of relevance feedback," in Proceedings of the 6th International Workshop on Content-based Multimedia Indexing (CBMI 2008), London, UK.

Navalpakkam V., et al., "An integrated model of top-down and bottom-up attention for optimal object detection," In: Proc. IEEE Conference on Computer Vision and Pattern Recognition (CVPR), 1-7, 2006.

Navalpakkam V., et al., "Sharing resources: buy attention, get recognition," In: Proc. International Workshop on Attention and Performance in Computer Vision (WAPCV'03), Graz, Austria, Jul. 2003.

* cited by examiner

| Method | Probability of Detection $P_D$ | | |
|---|---|---|---|
| | $P_{FA}=0.25$ | $P_{FA}=0.10$ | $P_{FA}=0.02$ |
| Cognitive Method | 0.78 | 0.42 | 0.23 |
| Neural Method | 0.82 | 0.54 | 0.1 |
| Present Invention Method#1 | 0.93 | 0.77 | 0.55 |
| Present Invention Method#2 | 0.96 | 0.88 | 0.64 |
| Present Invention Method#3 | 0.988 | 0.967 | 0.92 |
| Present Invention Method#4 | 0.999 | 0.996 | 0.994 |

FIG. 6

COGNITIVE-NEURAL METHOD FOR IMAGE ANALYSIS

BACKGROUND OF THE INVENTION (1) Field of Invention

The present invention relates to a cognitive-neural method for image analysis and, more specifically, to a closed-loop cognitive method and system which combines bio-inspired cognitive object detection algorithms with neural signatures of human visual processing to effectively identify items of interest in visual imagery.

(2) Description of Related Art

There are two main types of approaches for rapid search and categorization of items of interest in imagery and video. The first approach uses conventional machine vision methods or bio-inspired cognitive methods. These methods either need a predefined set of objects/items of interest or have very high false alarm rates. The second class of methods is based on neural signatures of object detection. These neural methods usually break the entire image into sub-images and process Electroencephalography (EEG) data from these images and classify them based on it. This approach also suffers from high false alarms and is usually slow because the entire image is chipped and presented to the human observer.

Some systems in the art use neural signals for classification of images into two categories: those that contain items of interest and those that do not. Thus, these systems are restricted to identifying items of interest that include single objects. In addition, the entire large image needs to be divided into small images (called chips) and presented as Rapid Serial Visual Presentation (RSVP) to an operator, which is slow. These systems also suffer from high false alarm rates. Other systems only deal with neural based classification and suffer from similar problems.

There exist in the art cognitive object detection methods that are based on bio-inspired models of human visual attention and stand out as the most established and widely referenced in this field. However, these methods return single pixels as salient points of attention and do not provide any region or extent of the object (i.e., its size and shape), as they usually spotlight an arbitrary region around a salient point. Often a single item of interest may contain multiple salient points. Thus, these methods are not very suitable or efficient for object detection in imagery/video.

Furthermore, in the area of surveillance, the ability to extract useful information from the terabytes of imagery gathered every day is limited by the number of image analysts available and the slow pace of the manual triage process. However, the ability to use this data effectively is contingent on rapid and accurate screening of surveillance imagery. Unfortunately, with the limited number of image analysts available, and the time it takes to process each image, vast numbers of images are not examined properly. The present state of image analysis lacks the speed and efficiency to adequately process the load of surveillance imagery needed in today's world.

Thus, a continuing need exists for an object detection method and system which efficiently combines the benefits of both cognitive and neural object detection methods to provide a system which can process large volumes of imagery and adapt to changes in search goals in situ.

SUMMARY OF INVENTION

The present invention relates to a cognitive-neural method for image analysis and, more specifically, to a closed-loop cognitive method and system which combines bio-inspired cognitive object detection methods with neural signatures of human visual processing to effectively identify items of interest in visual imagery.

A first aspect of the present invention is a cognitive-neural method for image analysis comprising acts of: detecting a set of potential items of interest in an image by using a cognitive algorithm, and refining the set of potential items of interest by a neural analysis to produce a set of detected items of interest.

In another aspect of the method of the present invention, the cognitive algorithm is selected from the group consisting of an object-based attention algorithm, a feature-based attention algorithm, an object-based recognition algorithm, and a spatio-temporal pattern-based recognition algorithm.

In yet another aspect, the cognitive algorithm is configured to detect potential items of interest selected from the group consisting of single objects, multiple objects, and spatio-temporal patterns.

In another aspect of the method, the neural analysis is selected from the group consisting of Rapid Serial Visual Presentation (RSVP), real-time eye tracked Electro-Encephalography (EEG), and presenting the set of potential items of interest to an operator for operator-controlled visual inspection and validation.

In yet another aspect, the method further comprises the act of fusing output from the cognitive algorithm and neural analysis using fusion classification.

In another aspect, the method further comprises an act of adapting the cognitive algorithm based on information gained from the results of the neural analysis and fusion classification, thereby allowing the cognitive algorithm to learn new items of interest and to present more accurate sets of potential items of interest for neural analysis.

In a further aspect of the present invention, the cognitive algorithm is adapted using a method selected from the group consisting of Feature-Based Optimal Biasing, using an association of gaze position from eye-tracked Electro-Encephalography and gist, and categorizing items of interest using visual swarm technology.

As can be appreciated by one skilled in the art, the present invention also comprises a data processing system for cognitive-neural image analysis having a memory and a processor, the data processing system including computer-readable instructions for causing the data processing system to perform the acts of the method of the present invention.

Finally, as can be appreciated by one skilled in the art, the present invention further comprises a computer program product for cognitive-neural image analysis comprising a computer readable medium having computer-readable instruction encoded thereon for causing a data processing system to perform the acts of the method of the present invention.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a chart showing data from a pilot study showing the probability of detection and false alarm rates of the present invention compared to the current state of the art;

DETAILED DESCRIPTION

Figure 1:
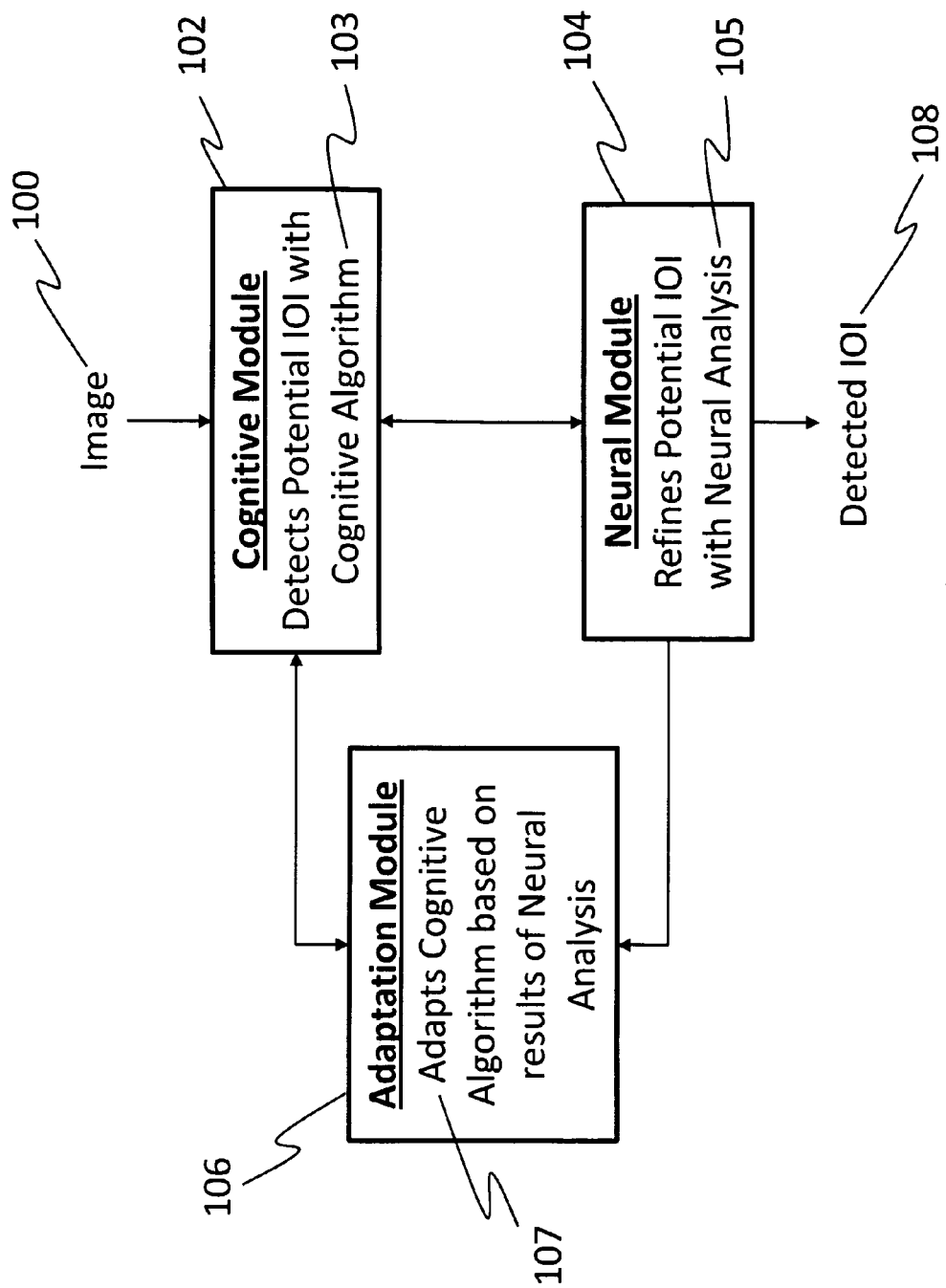
FIG. 1 is a flow diagram showing the overall method and system of the present invention.

The present invention relates to a cognitive-neural method for image analysis and, more specifically, to a closed-loop cognitive method and system which combines bio-inspired cognitive object detection methods with neural signatures of human visual processing to effectively identify items of interest in visual imagery. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents incorporated herein by reference, as well as all papers which are filed concurrently with this specification and which are open to public inspection with this specification, the contents of all such papers and documents also being incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction.

Instead, they are used to reflect relative locations and/or directions between various portions of an object.

(1) Glossary of Terms—The following glossary is provided to define and clarify the terms and acronyms as used in this specification:

Cognitive Algorithm—any of a variety of object-based, feature-based, or spatio-temporal pattern (event) based attention or recognition algorithms used in the art of object detection.

EEG—Electroencephalography

IOI—items of interest

Neural Analysis—any of a variety of techniques using relying on processes of the human brain, such as RSVP, eye-tracked EEG, or presenting images to an operator for visual inspection.

$P_D$—Probability of detection.

$P_{FA}$—False alarm rate (probability of false alarm).

RSVP—Rapid Serial Visual Presentation (2) Introduction

The present invention relates to a closed-loop cognitive-neural method and system that combines recent technological breakthroughs in bio-vision cognitive object detection methods and neural signatures of human visual processing. In the most basic embodiment of this invention, it first uses bio-inspired cognitive methods for deciding potential items of interest (IOI) in a sequence of images/video. These potential IOI are then shown to a human and neural signatures of visual detection of IOI are collected and processed. The resulting signatures are used to categorize and provide final IOI. Since the context of what constitutes an IOI changes with the context/situation, the system constantly uses feedback from the human for learning and biases the cognitive algorithms for better detection of IOI in subsequent processing.

FIG. 1 is a flow diagram showing the overall method of the present invention.

A sample of video imagery 100 is sent to a cognitive module 102 where it is analyzed using a cognitive algorithm 103 to detect regions containing potential IOI. The set of potential IOI is refined in a neural module 104 with at least one neural analysis 105, and the results of the neural analysis can be output to an adaptation module 106 and/or stored as a detected set of IOI 108. The method additionally enables on-line learning of the cognitive algorithm via an adaptation module 106 by adapting 107 the cognitive algorithm 103 based on information gained from the results of the neural analysis 105 whereby in future searches the method will be considerably faster and more accurate than a simple linear integration of cognitive and neural analyses. Thus, the present invention can be divided into the following main components: (3) Cognitive Module, (4) Neural Module, and (5) Adaptation Module. The remainder of the description shall focus on each of these components in turn, and will then discuss (6) Promising and Unexpected Results achieved by this configuration. The description will conclude with disclosure of a (7) data processing system, and (8) computer program product for use with the present invention.

(3) Cognitive Module

Figure 2:
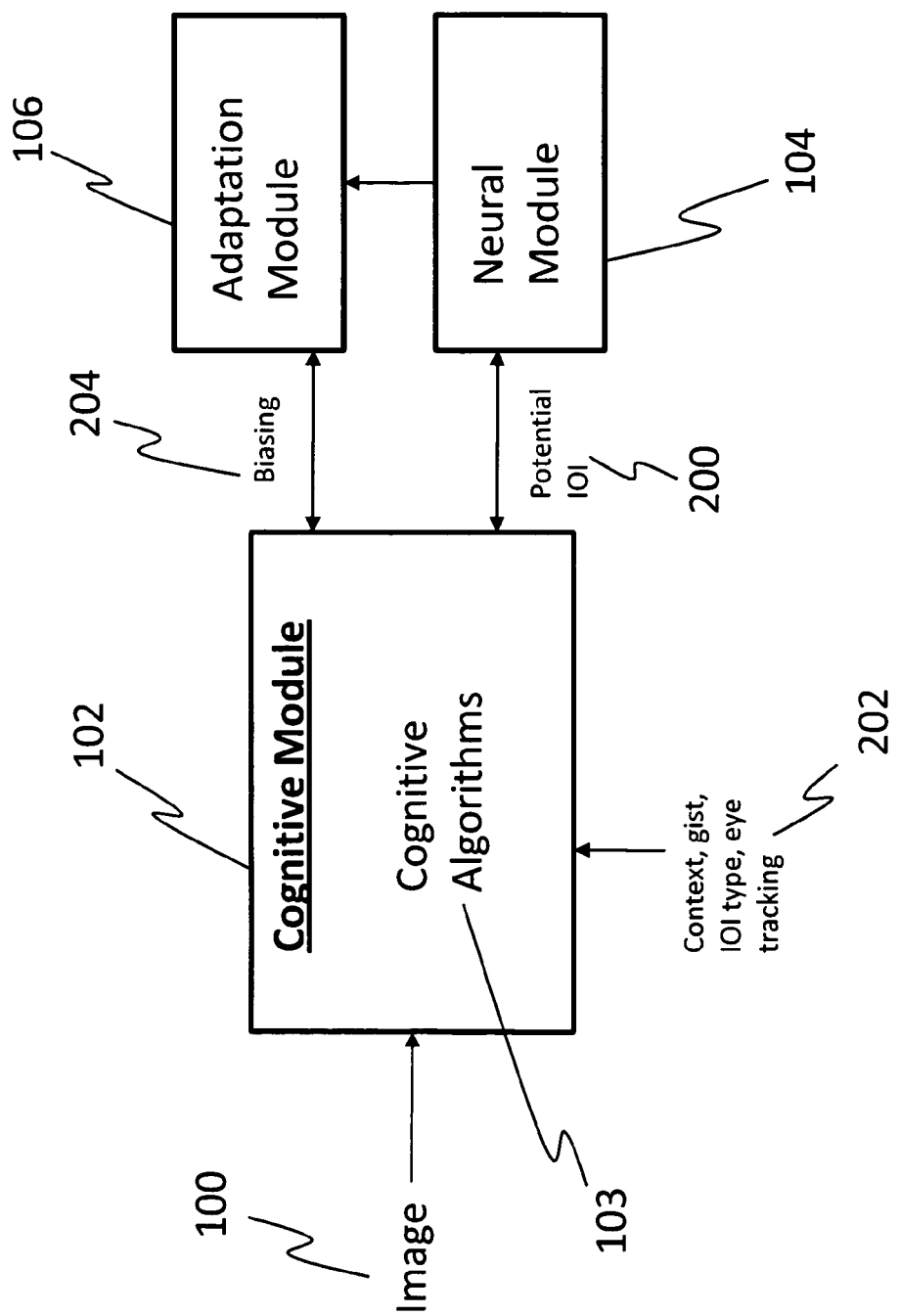
FIG. 2 is a block diagram showing the interaction of the cognitive module with other system components of the present invention.

Referring now to FIG. 2, the cognitive module 102 analyzes image/video data 100 using at least one cognitive algorithm 103 and tags regions in the image containing potential IOI 200 to be further analyzed by neural analysis 105 (FIG. 3) in the next step. The regions may be ordered by importance before being presented for neural analysis. This module can contain and combine one or more algorithms including bio-inspired attention, gist extraction, and motion detection algorithms. Several selectable input parameters 202 such as types of items of interest, context, etc. can be used to provide a user flexibility and control in specifying goals. Based on the selected inputs, the appropriately tuned or biased algorithms 204 can be run to detect IOI.

(3.1) Object-Based Attention Algorithm

A variety of object detection algorithms known in the art can be used with the present invention, such as object-based attention algorithms. The attention algorithm used by the inventors derives its inspiration from the biologically inspired, object-based visual saliency models of attention. The attention algorithm is described below.

Input to an object attention section of the cognitive module is in the form of static color images. If black and white images are presented as input to the module, they are converted to an RGB color format (although they are still black and white images). A pair of intensity channels, L and D (light and dark), is calculated from the input image by averaging the red, green, and blue channels: L=(r+g+b)/3 and D=255−L. Four fully-saturated color channels are created (red, green, blue, and yellow) that yield zero-response to white, effectively separating the effects of the color and intensity channels:

$$R = r - \frac{(g+b)}{2}, G = g - \frac{(r+b)}{2}, B = b - \frac{(r+g)}{2}, \text{ and}$$

$$Y = \frac{(r+g)}{2} - \frac{|r-g|}{2} - b.$$

All negative values are thresholded at zero. Feature opponency maps corresponding to the receptive fields in the retina for red-center/green surround ($E_{RG}$), green-center/red-surround ($E_{GR}$), blue-center/yellow-surround ($E_B$), bright-center/dark-surround ($E_{LD}$), and dark-center/bright-surround ($E_{DL}$) are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. Each opponent feature map is computed when the surround channel is subtracted from the center channel. This process is repeated for each center-surround channel pairing.

The gradient information of each opponency map is computed by convolving it with a Sobel filter, which extracts the edge information from each map. A master edge map, E, is computed by representing each pixel (x,y) by its maximum value across all of the edge maps, as defined above, in a winner-take-all fashion often exhibited by neural cells:

$$E(x,y) = \max\{E_{RG}(x,y), E_{GR}(x,y), E_{BY}(x,y), E_{LD}(x,y), E_{DL}(x,y)\}$$

The master edge map is processed by a watershed algorithm, which completes the boundaries and closes the contours provided by the edge map and represents these regions as segmented proto-objects. The phase differences between neighboring visual cortical neurons are believed to contribute to the segmentation of objects in a scene and perceptual grouping of "blobs." The watershed transform simulates these activities. Figure-ground separation is achieved by tagging those watershed regions that occupy a disproportionately large region of the image space as "background" and all others as foreground proto-objects. Segmented proto-objects that only occupy a small fraction of the scene (<2%) are discounted as noise.

Once the scene has been segmented into a grouping of proto-objects, the saliency of each is computed and ranked relative to the other proto-objects in the image. For each, the local neighborhood is represented by a rectangular bounding box surrounding the object whose area is three times larger than the object. The bottom up saliency of a given proto-object is defined as:

$$S_{BU} = \sqrt{\sum_i (\Delta FEAT_i)^2},$$

where the contrast term $\Delta FEAT_i$ for the $i^{th}$ feature is computed as the difference between the average feature value within the object boundary and the average feature value outside of the object, but within the bounding box:

$$\Delta FEAT_i = \langle FEAT_i \rangle_{object} - \langle FEAT_i \rangle_{surround}.$$

The proto-object regions are sorted from most to least salient, and the segmentation data is forwarded to an object recognition section of the cognitive module. Because each object can only be attended to once, the result is better than if an inhibition of return had been implemented on the most salient object.

(3.2) Other Cognitive Algorithms

The present invention can utilize any of a number of other cognitive algorithms known in the art for detection and recognition of single objects, multiple objects or spatio-temporal patterns (events).

(4) Neural Module

Figure 3:
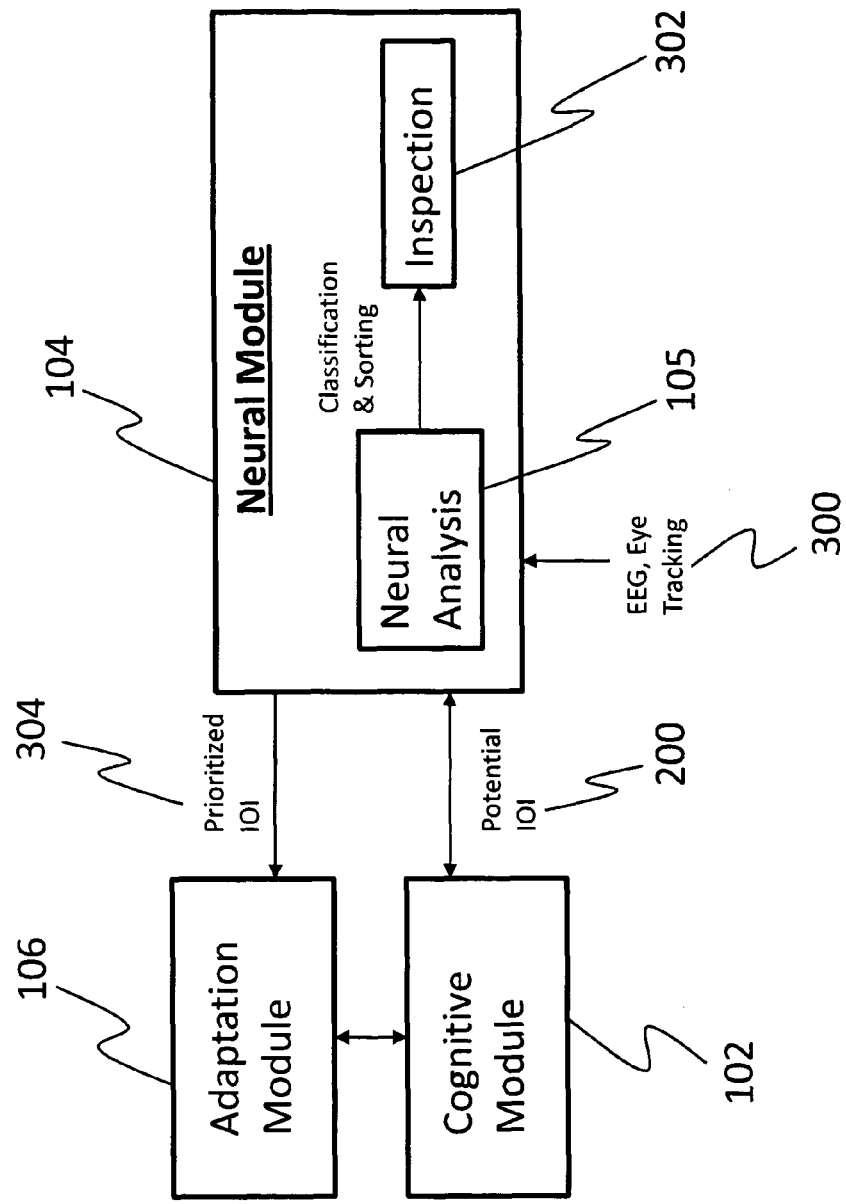
FIG. 3 is a block diagram showing the interaction of the neural module with the other system components of the present invention.

The neural module 104, as shown in FIG. 3, is the brain-in-the-loop part of the present invention, which refines the set of potential IOI 200 from the cognitive algorithm using neural analysis 105. It has been shown that the search for and detection of a specific visual stimulus by the human visual system can be tracked using neurophysiological measures or through eye-tracking technology. For example, see "A Fusion Approach for Image Triage using Single Trial ERP Detection" Yonghong Huang, Deniz Erdogmus, Santosh Mathan, Misha Pavel, Member, IEEE. Proceedings of the 3rd International IEEE EMBS Conference on Neural Engineering Kohala Coast, Hawaii, USA, May 2-5, 2007, which is incorporated by reference as though fully set forth herein.

Electroencephalography (EEG) recordings and eye fixation measurements 300 are taken from the user as they look at a visual image.

Visual images corresponding to the potential IOI regions tagged by the cognitive module are presented as RSVP images (typically 256×256 sized image around the IOI) on a standard display monitor at a typical 10 Hz rate as the person looks at these images and EEG measurements from standard EEG electrodes (32-128 electrodes) is recorded. The EEG measurements are then pre-processed via bandpass filtering in the desired frequency range (typically 1-100 Hz). The onset of presentation of each visual image is also recorded and this onset is used as a starting trigger to create EEG data segments (or epochs) from the EEG measurements. Each data segment corresponds to each image presentation, is typically 1 sec long, and contains the neural signatures of the desired visual response for that image presentation. Each data segment is then classified into one of two classes—segments that contain item of interest or segments that do not contain the item of interest. In practice, each data segment is assigned a continuous score or likelihood of it belonging to each class. The neural module includes an explicit training step during which known images of objects and non-objects are presented and the learning of features & classifier in the corresponding data segments is carried out. This learning in the neural analysis module 105 can be done using any of the multiple state-of-art algorithms such as time series analysis, feature extraction and classification methods. In the pilot study described later, linear discrimination analysis of RSVP EEG data was used for classification of neural signatures into IOI and non-IOI regions or images. Once the learning is complete, the learning classifier is used for subsequent classification of the data segments. Thus each data segment & its corresponding visual image are assigned a classification score, typically between 0-1, for each of the classes (Item of interest or No Item of interest). High classification scores indicate a high likelihood of belonging to that class and vice versa. This is a common practice in all classifiers and a threshold can be chosen to achieve a desired trade off between true detections and false alarms to generate traditional ROC (Receiver Operating Characteristics) performance curves, if desired.

The neural module 104 can also include optional eye tracking measurements 300. This is useful if instead of presenting the potential 101 regions as RSVP images, the entire image is displayed with potential IOI regions highlighted (e.g., as a box around them). The user then looks at these regions and continuous EEG measurements are recorded. However, instead of using the RSVP image onset as a trigger for data segments or epochs, the onset of eye fixation is used as that trigger. The rest of the approach described above for RSVP is applicable to eye tracking-triggered analysis as well. With the above description, one can therefore estimate the likelihood of an item of interest existing in a region of the image or at a specific location.

The neural analysis module 105 further sorts in descending order (highest scores first) the potential IOI regions based on classification scores of the IOI class. The neural analysis can also include presentation of these IOI regions in the sorted order for manual visual inspection 302 by the operator. If there are too many regions and time critical processing is required, then the operator can chose to only inspect the top few highest score regions. This inspection step 302 may or may not be used. The output of the inspection step 302 is a subset of the sorted regions that the operator has manually confirmed and selected as real IOI. The refined set of potential IOI can be prioritized 304 and sent to the adaptation module 106.

(5) Adaptation Module

Figure 4:
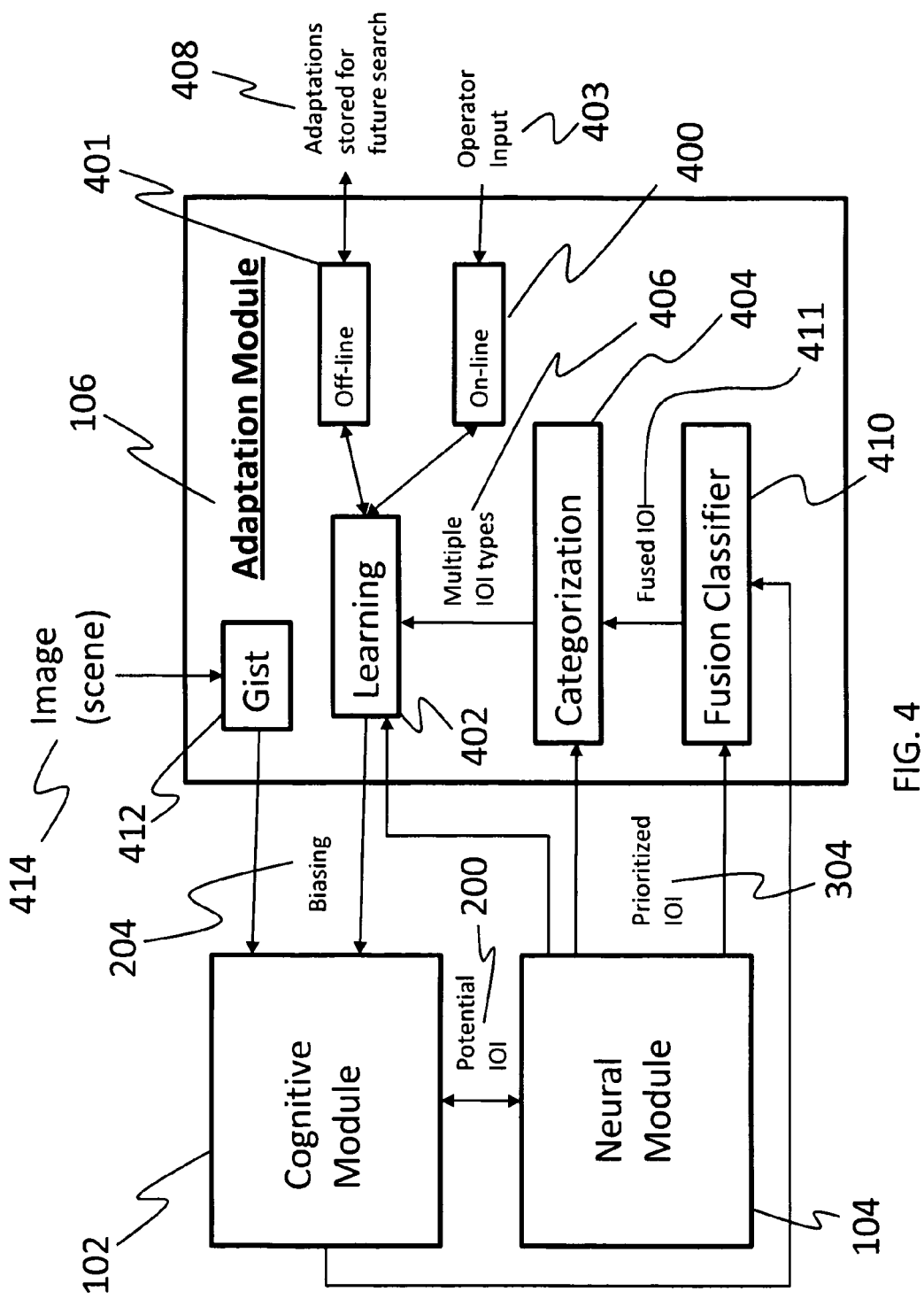
FIG. 4 is a block diagram showing the interaction of the adaptation module with the other system components of the present invention.

Adding an adaptive mechanism to the cognitive-neural method serves to both increase the probability of detection ($P_D$) and reduce the false alarm rate ($P_{FA}$). The adaptation module 106, as shown in FIG. 4 achieves this goal by using information from the neural module 102 in the form of probable and prioritized IOI 304, eye tracking and, optionally, operator input such as button presses indicating acceptance or rejection to adapt and bias 204 the cognitive algorithm for better IOI detection in future processing steps. Adaptation can occur either on-line 400 or off-line 401. In on-line 400 adaptation, operator inputs 403 are used to bias 204 the cognitive module 102 so that it improves its performance in close to real-time on subsequent image frames or video. In off-line 401 mode, the adaptations can be made and stored for a future search 408. The adaptation module 106 can contain both learning 402, described in detail in section 5.1 below, and categorization 404 algorithms, which are described in detail in section 5.3 below. Categorizing possible IOI into multiple IOI types 406 based on similarities yields higher $P_D$ and lower $P_{FA}$ than lumping possible IOI together, as discussed in the next section. Additionally, a fusion classifier 410 such as a Support Vector Machine (SVM) classifier can be used to fuse the outputs from the cognitive and neural modules 102 and 104 to produce a set of fused IOI 411 before categorization 404. It should be noted that the operations of the adaptation process can also be performed without use of a fusion classifier 410, in which case the prioritized IOI will be sent directly to the categorization 404 and learning 402 stages. Finally, the cognitive module 102 can be further biased 204 by associating the gist 412 of a scene 414 with likely spatial object locations. Gist-based learning is discussed in greater detail in section (5.2).

(5.1) Feature-Based Biasing Via Learning 402 (in FIG. 4)

In recent work, it has been shown how one can optimally bias attention towards objects of interest, once one knows the statistics of the objects as well as of the background clutter; see Navalpakkam, V., Itti, L., (2005), "Modeling the influence of task on attention," Vision Research, 45: 205-231; Navalpakkam, V., Itti, L., (2007), "Search goal tunes visual features optimally," Neuron, 53: 605-617; and Peters, R. J., Itti, L., (2007), "Beyond bottom-up: Incorporating task-dependent influences into a computational model of spatial attention," In: Proc. IEEE Conference on Computer Vision and Pattern Recognition (CVPR), all of which are incorporated by reference as though fully set forth herein. This has been tested with psychophysics experiments where it was showed that humans deploy the optimal biasing strategy, which may sometimes differ from the obvious strategy of simply boosting neurons which respond well to the object (this may sometimes be detrimental if these neurons also respond well to clutter). In addition, this strategy has been applied to simple learning and biasing towards real objects in complex scenes, for example, finding cell phones or pens in busy office settings. The present invention can employ this strategy for top-down biasing of the cognitive module to optimize detection of goal-directed IOI.

(5.2) Learning to Associate Gist with Likely Spatial Location of Objects (Gist-based Learning) 412 (in FIG. 4)

Previous work has also shown that one can learn the association between gaze position (from eye-tracking) and gist; see Peters, R. J., Itti, L., (2007), "Beyond bottom-up: Incorporating task-dependent influences into a computational model of spatial attention," In: Proc. IEEE Conference on Computer Vision and Pattern Recognition (CVPR), which is incorporated by reference as though fully set forth herein. Gist is the general class or category of the image or scene, for example, indoor versus outdoor scenes have very different gists. The result of this algorithm is that when a new scene is presented, its gist can be computed and can provide a spatial bias towards locations which are more likely to contain objects based on previous exposure to scenes with similar gist. For example, this algorithm can learn that items of interest typically are more likely to lie on the horizon line. Algorithms such as this can be used in a different aspect of the adaptation module of the present invention.

(5.3) Multi-Category Learning and Biasing (Categorization) 404 (in FIG. 4)

In order to bias the feature selection toward specific IOI, the category of the IOI must be known. The present invention can employ SwarmVision technology for appearance-based categorization of IOI into known categories of interest; see Y. Owechko and S. Medasani (2005), "A Swarm-Based Volition/Attention Framework for Object Recognition," IEEE Conference on Computer Vision and Pattern Recognition, San Diego; Y. Owechko and S. Medasani (2005), "Cognitive Swarms for Rapid Detection of Objects and Associations in Visual Imagery," IEEE Swarm Intelligence Symposium; S. Medasani and Y. Owechko (2005), "Possibilistic Particle Swarms for Optimization," Proceedings 5673 of SPIE/IST Symposium on Electronic Imaging; and S. Medasani, N. Srinivasa, and Y. Owechko (2004), "Active Learning System for Object Fingerprinting," International Joint Conference on Neural Networks, all of which are incorporated by reference as though fully set forth herein. For example, if the goal was to find automobiles in satellite imagery, then one category would be automobiles. Swarm Vision can currently reliably determine the presence of both moving and stationary vehicles and dismounts at 15 frames per second on conventional hardware using a combination of detection cascades with swarm-based search methods. This approach finds and categorizes IOI regions very quickly without down-sampling or exhaustive search using a combination of swarm dynamics, bottom-up cueing, and top-down IOI categorization feedback to the search dynamics. Each particle in the swarm evaluates an objective function value representing the IOI category confidence that the particle's location in spatial position and other parameter dimensions matches a known IOI in the image. Each categorizer consists of a cascade of sub-categorizers with wavelet, fuzzy edge symmetry, and oriented gradient features as inputs. This results in a very high probability of detection and a very low numbers of false alarms. Since this is an appearance-based detection strategy, a bias can be provided to the cognitive algorithm based on a single IOI example. The SwarmVision framework could be easily parallelized and implemented in low power field programmable gate array (FPGA) hardware.

(6) Experimental Results

A pilot study was conducted to test the performance of the present invention on finding IOI in real-world data. In this study, a series of 626 satellite image chips from commercial imagery containing a total of 515 non-object chips and 109 object chips. The object chips, comprising automobiles, were the IOI for the study. The goal was to show that the present invention can analyze these satellite images and can detect the automobiles with high probability of detection and low false alarm rates compared to the state-of-art cognitive and neural methods.

A total of N=3 subjects were shown test images randomly ordered in a RSVP paradigm at 10 Hz and EEG data was collected using a 256-channel system from Electrical Geodesics (EGI); see http://www.egi.com/. All images were constrained to be the same size (480×480 dpi) and object images clipped so that the object was centered to within 2 degrees of visual angle of the central fixation point on the monitor. Participants were seated 60 cm away from the monitor. Test images were created by combining randomly chosen object and non-object chips between 1 and 5. A number of object and non-object chips were chosen to create 5000 test images of size 2×2, 3×3, 4×4 and 5×5 image chips. The test chips were placed at random locations in these images. While many of these images contained the same object chips, the presence of other non-object chips in them was highly variable and therefore gave different performance for saliency/surprise algorithms since these algorithms use global image information for computing salient regions.

Figure 5:
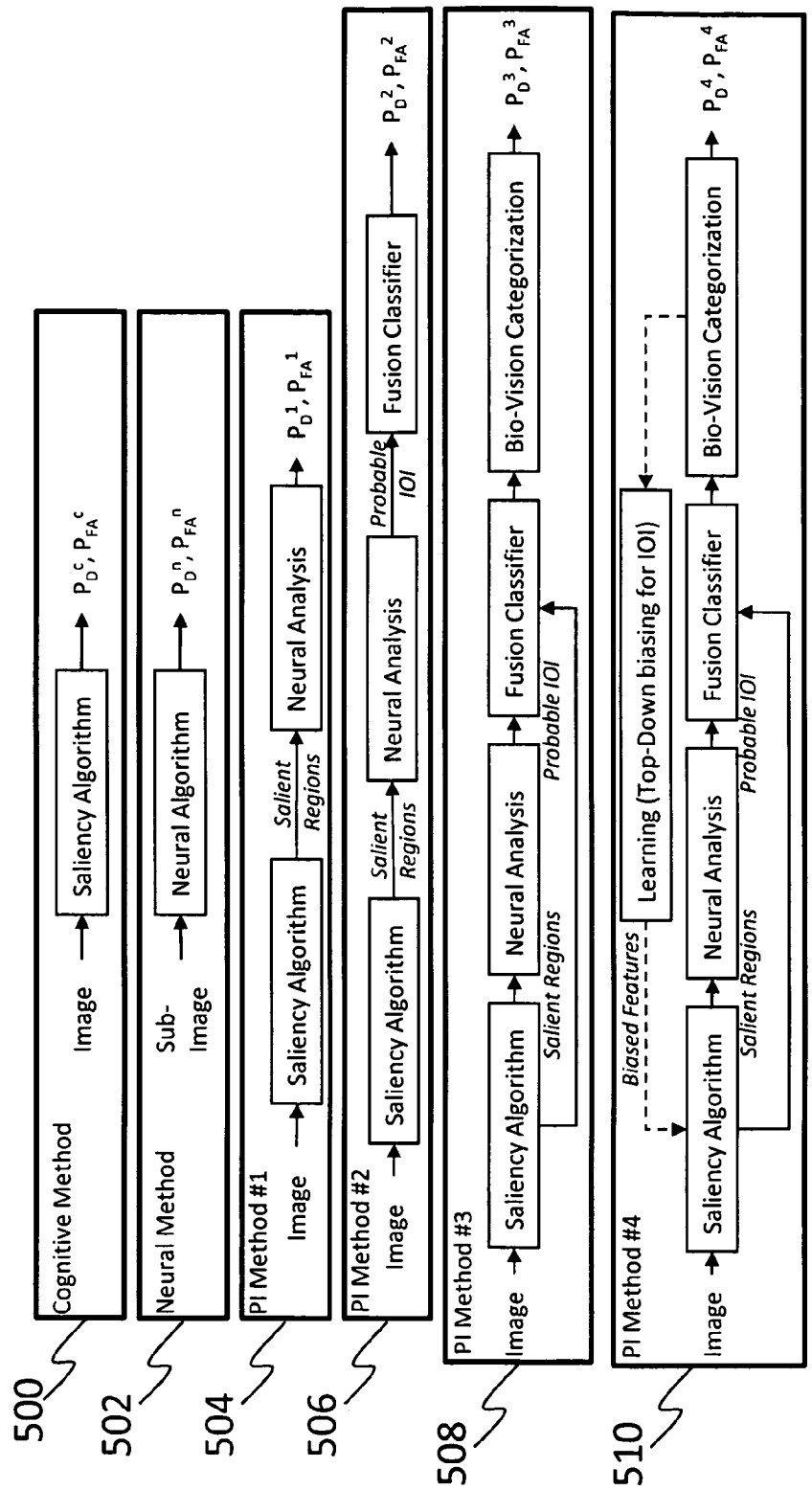
FIG. 5 is a block diagram showing various combinations of object detection methods for use with the present invention.

FIG. 5 summarizes the study of combinations of various methods used in the initial study. The methods using cognitive 500 and neural algorithms 502 could be considered representative state-of-the-art methods in image/video analysis for finding IOI. The integrated methods #1-4 (504, 506, 508, and 510, respectively) are representative of approaches in the present invention. Below is a summary of the results for each combination shown in FIG. 5. Note: the variables $P_D$ and $P_{FA}$ in FIG. 5 represent the Probability of Detection and False Alarm Rate, respectively, for each combination. Superscripts used in conjunction with $P_D$ and $P_{FA}$ are for identification purposes only, for instance, the $P_D$ and $P_{FA}$ for the cognitive algorithm 500 alone are labeled $P_D^c$, $P_{FA}^c$:

Cognitive Method alone 500: The images were tested using a bottom-up saliency algorithm. The thresholded variance of the saliency map yielded a good $P_D/P_{FA}$ combination.

Neural Method alone 502: EEG data was analyzed and all 626 satellite images were classified into object and non-object categories using 1st-level logistic regression and subsequent 2nd-level Fisher's linear discriminant. Based on classification strength, each image was converted to a probability value.

Present Invention Method #1 504: Combined system where high saliency regions (variance exceeds threshold) would be shown to an operator and EEG measurements classified as in the Neural Method.

Present Invention Method #2 506: The outputs from saliency (saliency map) and neural algorithms (EEG logistic regression probability value) were fused by a Support Vector Machine (SVM) classifier.

Present Invention Method #3 508: All outputs were then categorized with a bio-inspired categorizer into IOI (vehicle) or non-IOI. The categorizer was trained on only ten object images. For details of the bio-inspired categorizer see Y. Owechko and S. Medasani (2005), "A Swarm-Based Volition/Attention Framework for Object Recognition," IEEE Conference on Computer Vision and Pattern Recognition, San Diego; Y. Owechko and S. Medasani (2005), "Cognitive Swarms for Rapid Detection of Objects and Associations in Visual Imagery," IEEE Swarm Intelligence Symposium; S. Medasani and Y. Owechko (2005), "Possibilistic Particle Swarms for Optimization," Proceedings 5673 of SPIE/IST Symposium on Electronic Imaging; and S. Medasani, N. Srinivasa, and Y. Owechko (2004), "Active Learning System for Object Fingerprinting," International Joint Conference on Neural Networks, all of which are incorporated by reference as though fully set forth herein.

Present Invention Method #4 510: Finally, only the regions identified as IOI were used to train the cognitive algorithm and biased version was re-run through the combination of Method #3 508.

FIG. 6 shows data of the results for the various combinations of methods tested. The values in the table represent the probability of detection in relation to a given false alarm rate 600. The table clearly suggests that the combinations used in the present invention 602 have a significantly higher $P_D$ in relation to the $P_{FA}$ than existing cognitive and neural methods that operate independently 604.

(7) Data Processing System

Figure 7:
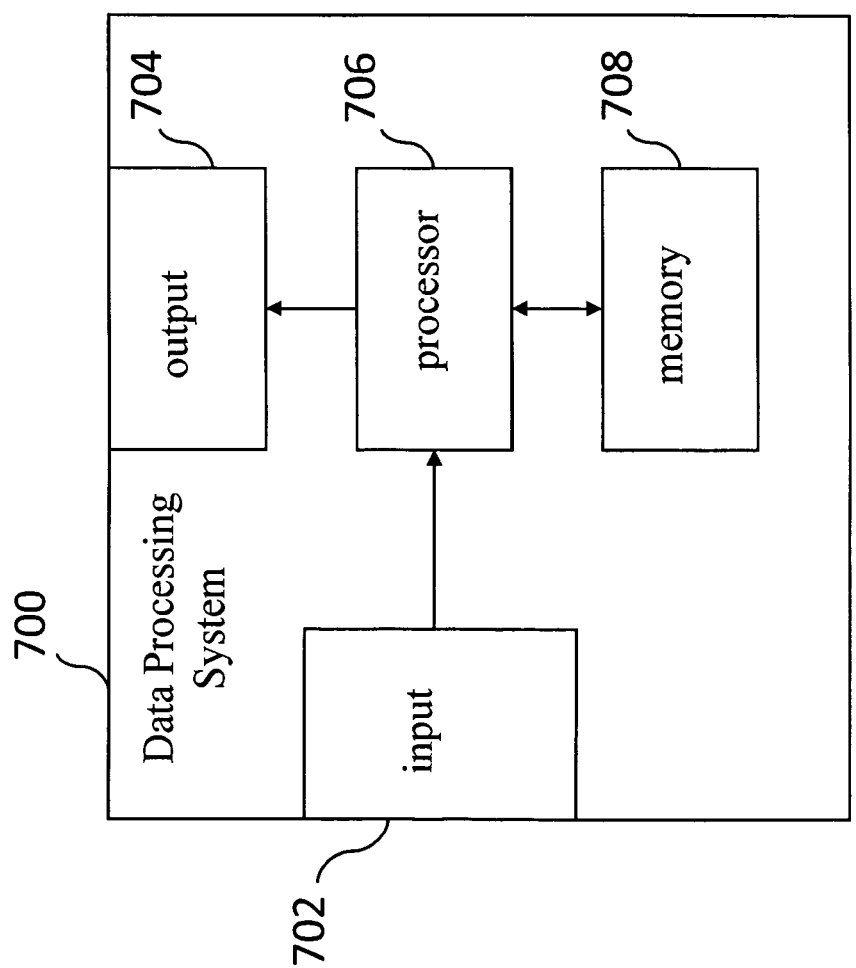
FIG. 7 is a block diagram showing a generic data processing system for use with the present invention.

A block diagram depicting the components of a generic image analysis data processing system for the present invention is provided in FIG. 7. The data processing system 700 comprises an input 702 for receiving information from at least one input data source or from an operator. Note that the input 702 may include multiple "ports." Typically, input is received from at least one imaging device, from stored image, or from a training set. The input may also comprise instructions from an operator, EEG readings, and eye-tracking. An output 704 is connected with the processor for providing information regarding the presence and/or identity of object(s) in the input signal to an operator, either for neural processing, or to display final results. The output 704 is generally presented as a prioritized list of IOI. Output may also be provided to other devices or other programs; e.g., to other software modules, for use therein. The input 702 and the output 704 are both coupled with one or more processors 706, the processor containing appropriate architecture to perform the acts of the method of the present invention, including, but not limited to detection of a set of potential IOI using a cognitive algorithm, refining the set of potential IOI by neural analysis, and adapting the cognitive algorithm based on the results of the neural analysis. The processor 706 is coupled with a memory 708 to permit storage of data such as image memory strings and software that are to be manipulated by commands to the processor 706.

(7) Computer Program Product

Figure 8:
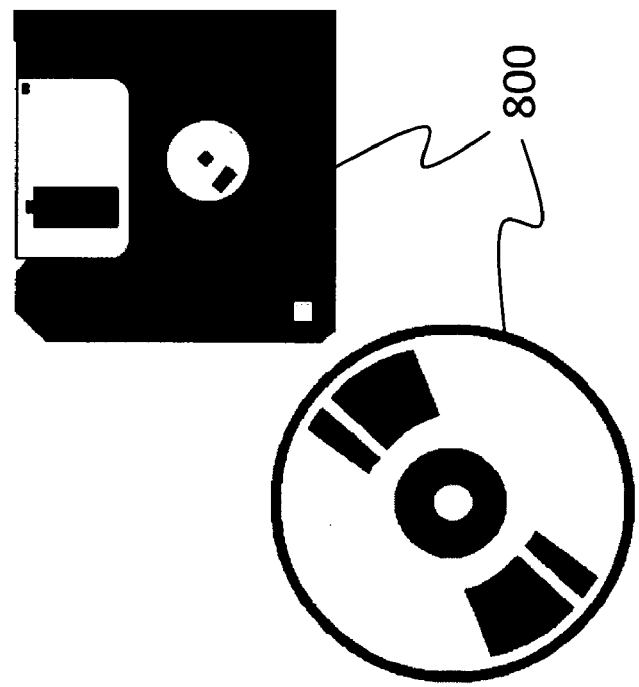
FIG. 8 is an illustration showing a computer program product in accordance with the present invention.

An illustrative diagram of a computer program product embodying the present invention is depicted in FIG. 8. The computer program product 800 is depicted as an optical disk such as a CD or DVD, but the computer program product generally represents any platform containing comprising computer-readable instruction means stored on a computer-readable medium that are executable by a computer having a processor for causing the processor to perform operations of the method of the present invention, as previously described.

What is claimed is:

1. A cognitive-neural method for detecting and prioritizing items of interest in visual imagery, comprising an act of initializing one or more processors to perform operations of:
    detecting a set of potential items of interest in an image using a cognitive algorithm;
    prioritizing the set of potential items of interest using neural analysis to produce a set of prioritized items of interest, whereby items of interest in the image are detected and prioritized; and
    adapting the cognitive algorithm based on the prioritized items of interest from the neural analysis.

2. The method of claim 1, wherein the cognitive algorithm is adapted using a technique selected from a group consisting of:
    feature-based optimal biasing via learning;
    combining categorizing items of interest using visual swarm technology with feature-based optimal biasing via learning; and
    gist-based learning.

3. The method of claim 2, wherein the cognitive algorithm is selected from a group consisting of an object-based attention algorithm, a feature-based attention algorithm, an object-based recognition algorithm, and a spatio-temporal pattern-based recognition algorithm.

4. The method of claim 3, wherein the cognitive algorithm is configured to detect potential items of interest selected from a group consisting of single objects, multiple objects, and spatio-temporal patterns.

5. The method of claim 4, wherein the neural analysis is selected from a group consisting of Rapid Serial Visual Presentation (RSVP), real-time eye tracked Electro-Encephalography (EEG), and presenting the set of potential items of interest to an operator for operator-controlled visual inspection and validation.

6. The method of claim 1, wherein the cognitive algorithm is selected from a group consisting of an object-based attention algorithm, a feature-based attention algorithm, an object-based recognition algorithm, and a spatio-temporal pattern-based recognition algorithm.

7. The method of claim 1, wherein the neural analysis is selected from a group consisting of Rapid Serial Visual Presentation (RSVP), real-time eye tracked Electro-Encephalography (EEG), and presenting the set of potential items of interest to an operator for operator-controlled visual inspection and validation.

8. The method of claim 1, further comprising operations of:
    fusing the potential items of interest from the cognitive algorithm with the prioritized items of interest from neural analysis using a fusion classifier to generate a set of fused items of interest; and
    adapting the cognitive algorithm based on the prioritized items of interest from the neural analysis and the fused items of interest from the fusion classifier.

9. The method of claim 8, wherein the cognitive algorithm is adapted using a technique selected from a group consisting of:
    feature-based optimal biasing via learning;
    combining categorizing items of interest using visual swarm technology with feature-based optimal biasing via learning; and
    gist-based learning.

10. A data processing system for detecting and prioritizing items of interest in visual imagery comprising one or more processors configured to perform operations of:
    detecting a set of potential items of interest in an image by using a cognitive algorithm;
    prioritizing the set of potential items of interest using neural analysis to produce a set of prioritized items of interest, whereby items of interest in the image are detected and prioritized; and
    adapting the cognitive algorithm based on the prioritized items of interest from the neural analysis.

11. The data processing system of claim 10, wherein the cognitive algorithm is adapted using a technique selected from a group consisting of:
    feature-based optimal biasing via learning;
    combining categorizing items of interest using visual swarm technology with feature-based optimal biasing via learning; and
    gist-based learning.

12. The data processing system of claim 11, wherein the cognitive algorithm is selected from a group consisting of an object-based attention algorithm, a feature-based attention algorithm, an object-based recognition algorithm, and a spatio-temporal pattern, based recognition algorithm.

13. The data processing system of claim 12, wherein the cognitive algorithm is configured to detect potential items of interest selected from a group consisting of single objects, multiple objects, and spatio-temporal patterns.

14. The data processing system of claim 13, wherein the neural analysis is selected from a group consisting of Rapid Serial Visual Presentation (RSVP), real-time eye tracked Electro-Encephalography (EEG), and presenting the set of potential items of interest to an operator for operator-controlled visual inspection and validation.

15. The data processing system of claim 10, wherein the cognitive algorithm is selected from a group consisting of an object-based attention algorithm, a feature-based attention algorithm, an object-based recognition algorithm, and a spatio-temporal pattern-based recognition algorithm.

16. The data processing system of claim 10, wherein the neural analysis is selected from a group consisting of Rapid Serial Visual Presentation (RSVP), real-time eye tracked Electro-Encephalography (EEG), and presenting the set of potential items of interest to an operator for operator-controlled visual inspection and validation.

17. The data processing system of claim 10, further configured to perform operations of:
    fusing the potential items of interest from the cognitive algorithm with the prioritized items of interest from neural analysis using a fusion classifier to generate a set of fused items of interest; and
    adapting the cognitive algorithm based on the prioritized items of interest from the neural analysis and the fused items of interest from the fusion classifier.

18. The data processing system of claim 17, wherein the cognitive algorithm is adapted using a technique selected from a group consisting of:
- feature-based optimal biasing via learning;
- combining categorizing items of interest using visual swarm technology with feature-based optimal biasing via learning; and
- gist-based learning.

19. A computer program product for detecting and prioritizing items of interest in visual imagery, the computer program product comprising computer-readable instruction means stored on a computer-readable medium that are executable by a computer having a processor for causing the processor to perform operations of:
- detecting a set of potential items of interest in an image by using a cognitive algorithm;
- prioritizing the set of potential items of interest using neural analysis to produce a set of prioritized items of interest, whereby items of interest in the image are detected and prioritized; and
- adapting the cognitive algorithm based on the prioritized items of interest from the neural analysis.

20. The computer program product of claim 19, wherein the cognitive algorithm is adapted using a technique selected from a group consisting of:
- feature-based optimal biasing via learning;
- combining categorizing items of interest using visual swarm technology with feature-based optimal biasing via learning; and
- gist-based learning.

21. The computer program product of claim 20, wherein the cognitive algorithm is selected from a group consisting of an object-based attention algorithm, a feature-based attention algorithm, an object-based recognition algorithm, and a spatio-temporal pattern-based recognition algorithm.

22. The computer program product of claim 21, wherein the cognitive algorithm is configured to detect potential items of interest selected from a group consisting of single objects, multiple objects, and spatio-temporal patterns.

23. The computer program product of claim 22, wherein the neural analysis is selected from a group consisting of Rapid Serial Visual Presentation (RSVP), real-time eye tracked Electro-Encephalography (EEG), and presenting the set of potential items of interest to an operator for operator-controlled visual inspection and validation.

24. The computer program product of claim 19, wherein the cognitive algorithm is selected from a group consisting of an object-based attention algorithm, a feature-based attention algorithm, an object-based recognition algorithm, and a spatio-temporal pattern-based recognition algorithm.

25. The computer program product of claim 19, wherein the neural analysis is selected from a group consisting of Rapid Serial Visual Presentation (RSVP), real-time eye tracked. Electro-Encephalography (EEG), and presenting the set of potential items of interest to an operator for operator-controlled visual inspection and validation.

26. The computer program product of claim 19, further comprising instruction means to cause the processor to perform operations of:
- fusing the potential items of interest from the cognitive algorithm with the prioritized items of interest from neural analysis using a fusion classifier to generate a set of fused items of interest; and
- adapting the cognitive algorithm based on the prioritized, items of interest from the neural analysis and the fused items of interest from the fusion classifier.

27. The computer program product of claim 26, wherein the cognitive algorithm is adapted using a technique selected from a group consisting of:
- feature-based optimal biasing via learning;
- combining categorizing items of interest using visual swarm technology with feature-based optimal biasing via learning; and
- gist-based learning.

\* \* \* \* \*